United States Patent [19]

Audesse et al.

[11] 4,303,963
[45] Dec. 1, 1981

[54] MULTILAMP PHOTOFLASH UNIT WITH PROTECTION AGAINST ELECTROSTATIC CHARGES

[75] Inventors: Emery G. Audesse, Beverly, Mass.; Donald W. Hartman; John W. Shaffer, both of Williamsport, Pa.

[73] Assignee: GTE Products Corporation, Stamford, Conn.

[21] Appl. No.: 85,167

[22] Filed: Oct. 15, 1979

[51] Int. Cl.³ ............................................. G03B 15/02
[52] U.S. Cl. ....................................... 362/15; 362/10; 362/240; 362/241
[58] Field of Search .................... 362/10, 15, 240, 241

[56] References Cited
U.S. PATENT DOCUMENTS
4,198,673 4/1980 Roelevink ............................ 362/13

Primary Examiner—Stephen J. Lechert, Jr.
Attorney, Agent, or Firm—Edward J. Coleman

[57] ABSTRACT

A photoflash unit comprising a linear array of flashlamps mounted on a printed circuit board disposed within the longitudinal channel of an elongated housing member having an enclosing cover panel of light-transmitting material. The lamp-firing circuitry includes a common circuit conductor run connected to one lead-in wire of each of the lamps. The housing member includes reflector cavities adjacent to the lamps, and a continuous coating of electrically conductive reflective material covers the surfaces of the channel and reflector cavities for providing both reflective surfaces for flashing lamps and, by virtue of a connection between the common run and conductive coating, a shield to reduce the likelihood of accidental flashing of lamps by electrostatic charges. Additional protection against electrostatic charges is provided by a plurality of tapered holes in the wall of the housing channel through which the continuous conductive coating extends to the exterior surface of the housing, thereby extending electrical ground to the exterior of the unit.

8 Claims, 5 Drawing Figures

MULTILAMP PHOTOFLASH UNIT WITH PROTECTION AGAINST ELECTROSTATIC CHARGES

BACKGROUND OF THE INVENTION

This invention relates to multilamp photoflash units having circuit means for igniting of the flashlamps, and, more particularly, to high voltage photoflash arrays with improved means for providing electrostatic protection.

Numerous multilamp photoflash arrangements with various types of sequencing circuits have been described in the prior art, particularly in the past few years. A currently marketed photoflash unit (described in U.S. Pat. Nos. 3,894,226 and 4,017,728 and referred to as flip-flash) employs high voltage type lamps adapted to be ignited sequentially by successively applied high voltage firing pulses (e.g., 2,000 to 4,000 volts) from a source such as a camera-shutter-actuated piezoelectric element. The flip-flash unit comprises an elongated planar array of eight high voltage type flashlamps mounted on a printed circuit board with an array of respectively associated reflectors disposed therebetween. The construction further includes the front and back plastic housing members with interlocking means for providing a unitary structure. The front housing member is a rectangular concavity, and the back housing is substantially flat. Sandwiched between the front and back housing members, in the order named, are the flashlamps, a unitary member, preferably of aluminum-coated plastic, shaped to provide the eight individual reflectors of the array, an insulating sheet, a printed circuit board, and an indicia sheet, which is provided with information, trademarks and flash indicators located behind the representative lamps which change color due to heat and/or light radiation from a flashing lamp, thus indicating at a glance which of the lamps have been flashed and not flashed.

The primers used in the high voltage type flashlamps employed in such arrays are designed to be highly sensitive toward high voltage breakdown. Electrical energies as low as a few microjoules are sufficient to promote ignition of such primers and flashing of the lamps. The high sensitivity is needed in order to provide lamps that will function reliably from the compact and inexpensive piezoelectric sources that are practical for incorporation into modern miniature cameras.

The high degree of electrical sensitivity needed in high voltage flashlamps gives rise to distinct problems of inadvertent flashing during handling of the array package. Any static charges on equipment and personnel can cause the lamps to flash. This problem is discussed in U.S. Pat. No. 3,935,442, and one means described therein for protecting against inadvertent flashing is to make the reflector member electrically conductive, such as fabricating it of metal or metal-coated plastic, and electrically connecting the reflector to an electrical "ground" portion of the circuitry on the circuit board. Thus, the reflector member functions as an electrical shield and increases the stray capacitance to ground of the electrical "ground" of the circuitry, reducing the possibility of the accidental flashing of the lamps by electrostatic voltage charges on a person or object touching the array.

A further approach, described in U.S. Pat. No. 3,941,992, for providing electrostatic protection is to metalize the back surface of the circuit board and connect that metalized surface to the common circuit conductor run, for example, by means of an eyelet through the board, thereby providing a planar conductive shield behind the lamps and circuitry. An alternative approach for providing a rear shield is described in U.S. Pat. No. 4,019,043, wherein a conductive shield of planar configuration is spaced from the back surface of the circuit board and connected to the common circuit conductor. In particular, this shield is described as comprising a sheet of metallic foil laminated to the indicia sheet.

Other patents relating to electrostatic protection for this general type of photoflash array include U.S. Pat. Nos. 3,980,875; 3,980,876; 4,093,979; 4,104,705; 4,104,706; 4,133,023; 4,136,375; and 4,060,721.

Improved approaches for enhancing the electrostatic protection provided by the aforementioned shielding techniques are described in other patents. For example, U.S. Pat. No. 3,980,877 employs one or more openings through the housing wall adjacent to an electrical ground part of the circuitry to provide a discharge path therethrough for a person or object touching the array. U.S. Pat. No. 4,041,300 describes the use of a plastic housing with a surface coating of electrically conductive material and one or more openings through the housing wall to provide a discharge path. And in U.S. Pat. No. 4,113,424, a plurality of conductive posts project from the grounded reflector array and protrude through respective openings in the light-transmitting front face of the housing.

A copending patent application Ser. No. 72,251, assigned to the present assignee, describes a more compact, cost-efficient photoflash unit construction comprising a linear array of electrically ignitable flashlamps mounted on a printed circuit board in the form of an elongated strip. The printed circuit board is located within the longitudinal channel of an elongated housing member having a continuous coating of conductive reflective material thereon adjacent to the lamps. A light-transmitting cover panel is attached to the front of the housing member to enclose the flashlamps. The lamps have substantially tubular envelopes and are positioned extremely close to one another with their longitudinal axes substantially parallel to the surface of the printed circuit strip and in substantially coaxial alignment. Typically, the diameter of the lamps, the width of the printed circuit strip and the width of the channel in the housing member are nearly equal. The circuitry on the circuit board includes one conductor run which is connected in common to a lead-in wire of each of the lamps of the array. Means, such as a segment of a soldered wire or an edge deposit of conductive material, is disposed between the common circuit conductor run and the channel wall of the housing in contact with the conductive-reflective coating thereon. In this manner, the conductive wall coating is grounded to common to provide an electrostatic shield for the unit. Protection against electrostatic charges about the front face of the unit is provided in a manner following teachings of the aforementioned U.S. Pat. No. 4,133,424. More specifically, the light-transmitting cover panel is provided with a plurality of openings, and conductive projections in the housing member protrude through the cover openings to extend the circuit ground to the exterior of the front face of the unit.

The aforementioned compact linear array construction, however, does not provide such an exterior ground mode of protection for the rear of the unit.

Accordingly, the present invention is particularly directed to the object of providing enhanced electrostatic protection at the rear of the unit. This poses a problem, however, as the aforementioned approaches employed with the more complex photoflash structures, including the use of separate shields of metalic foil, are not totally satisfactory or compatible with the compactness, simplicity, and cost-effective characteristics, of the aforementioned linear photoflash array, wherein the unit housing provides the additional functions of multicavity reflector and electrostatic shield for the circuit strip-lamp assembly mounted internally thereof.

SUMMARY OF THE INVENTION

Accordingly, it is an object of the present invention to provide an improved multilamp photoflash unit of compact, simplified construction which cost-effectively includes means for significantly reducing inadvertent electrostatic flashing of the lamps contained therein.

These and other objects, advantages, and features are attained in a multilamp photoflash unit comprising a printed circuit board having lamp-firing circuitry on a surface thereof to which the lead-in wires of an array of flashlamps are connected. The circuitry on the circuit board includes a common circuit conductor run connected electrically to one lead-in wire of each of the lamps. The unit further includes a housing member having a channel within which the printed circuit board is located. The interior walls of the housing channel are covered with a continuous coating of electrically conductive reflective material for providing reflective surfaces adjacent to the flashlamps, and means is provided for electrically connecting these reflective surfaces to the common circuit conductor run on the circuit board. In accordance with the invention, one or more openings are provided through the wall of the housing channel, and the continuous coating of conductive reflective material is extended through each of these openings to the exterior surface of the housing member. In this manner electrostatic protection is provided by extending electrical ground to the exterior of the unit in a cost-effective manner compatible with the simplicity and compactness of the construction.

In a preferred embodiment, the circuit board is in the form of an elongated strip, the flashlamps are disposed on a linear array over the current-carrying surface of the circuit strip, and the housing member has an elongated configuration with the channel longitudinally disposed therein. The cross-section of the channel is substantially semi-rectangular, and the rear wall and opposite sidewalls of the channel are covered with the continuous coating of conductive-reflective material. The circuit board is parallel to the rear wall of the channel, and the current-flow-promoting conductive openings extend through this rear wall of the channel. The openings are distributed linearly along the length of the rear wall of the housing channel, and each opening has the configuration of a substantially circular hole tapered from a larger diameter on the interior side of the wall to a smaller diameter on the exterior side of the wall. The preferred housing member is formed of an insulating material and includes a plurality of segments of reflector cavities formed on opposite sides of the channel. The surfaces of the channel, reflector cavities and the tapered openings in the rear walls of the channel are all covered with the continuous coating of conductive reflective material. In this manner the housing member functions as a multicavity reflector member, and a shield and discharge means for providing electrostatic protection.

BRIEF DESCRIPTION OF THE DRAWINGS

This invention will be more fully described hereinafter in conjunction with the accompanying drawings in which.

DESCRIPTION OF PREFERRED EMBODIMENT

Figures 1, 2:
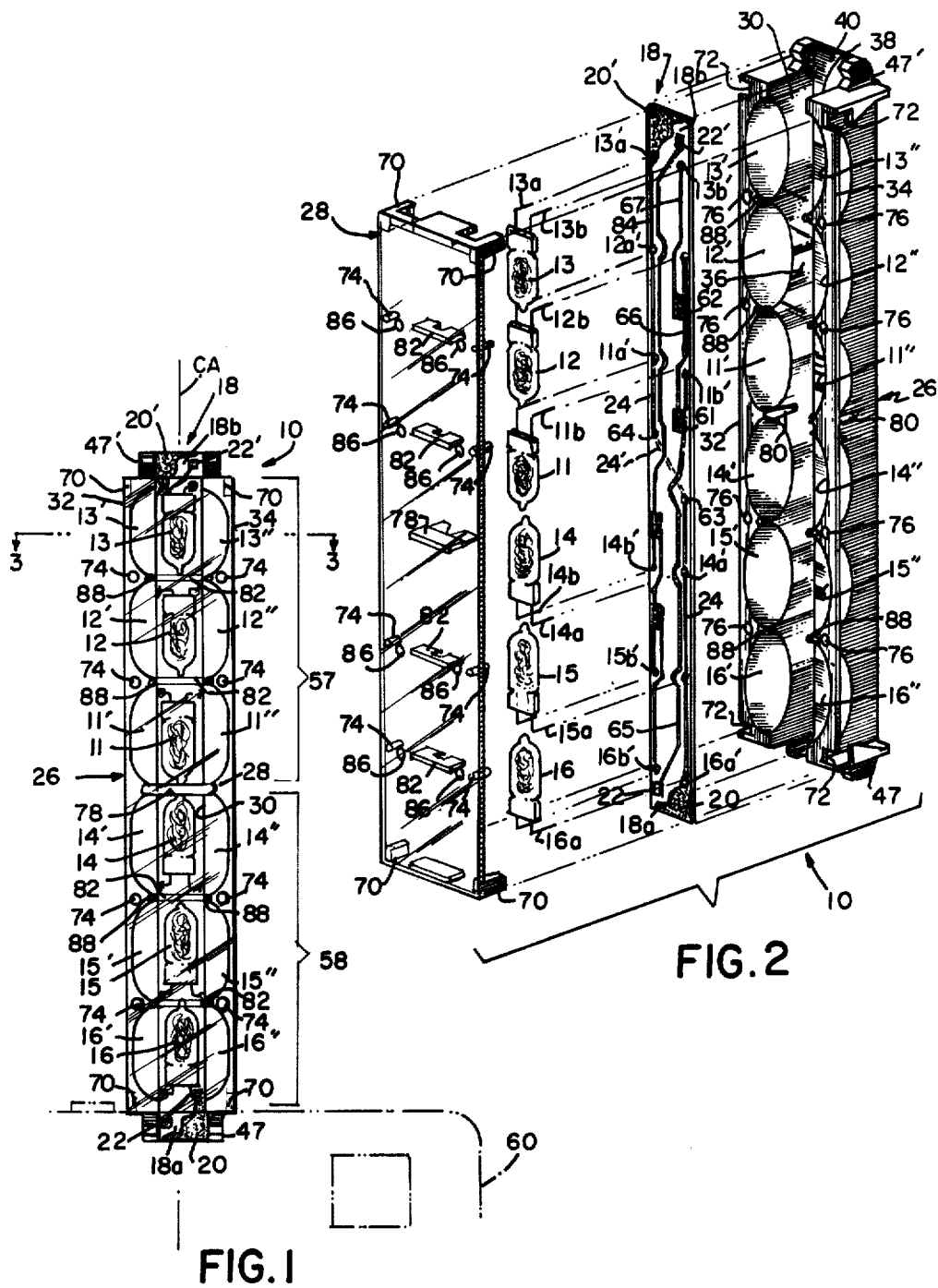
FIG. 1 is a front elevation of a multilamp photoflash unit in accordance with the invention, with the camera on which it is mounted shown in phantom.
FIG. 2 is an exploded perspective view of the photoflash unit of FIG. 1.

FIGS. 1 and 2 illustrate a multilamp photoflash unit 10 similar to that described in the aforementioned copending application Ser. No. 72,526, now U.S. Pat. No. 4,245,279. It comprises a linear array of six flashlamps 11–13 and 14–16 mounted on a printed circuit board 18 in the form of an elongated strip. Each of the lamps has a pair of lead-in wires 11a, 11b, etc., connected to the printed circuitry on strip 18. For example, the lead-in wires 11a, 11b, etc., may be soldered to respective connector pads 11a', 11b', etc., forming portions of the conductive circuit runs on strip 18. Each of the lamps 11, etc., has a tubular light-transmitting glass envelope having a press-seal base at one end through which the lead-in wires emerge, and an exhaust tip at the other end. The envelope is filled with a quantity of filamentary combustible material, such as shredded zirconium, and a combustion-supporting gas, such as oxygen. The ignition means within the lamp envelope may comprise, in the case of a low voltage source, a filament connected across the inner ends of the lead-in wires with beads of primer material disposed about the junctions of the lead-in wires and filament. In the case of a high voltage power source, for which the illustrated embodiment is particularly intended, the ignition structure may comprise a primer bridge or a spark gap type construction. For example, a particularly suitable high voltage type flashlamp suitable for use in the linear array according to the present invention is described in U.S. Pat. No. 4,059,389, wherein the ignition structure comprises a pair of spaced apart lead-in wires with spherically shaped terminations, a glass frit coating over lead-in wires, and a coating of primer material over the frit-coated terminations. The primer may bridge the wire terminations or comprise separate spaced apart coatings on the respective terminations, with the filamentary combustible being in contact with both terminations to a conducting path therebetween.

When the flashlamps are mounted and positioned on circuit strip 18, the lead-in wires 11a, 11b, etc., are bent at a right angle, as illustrated, so that all of the tubular envelopes of the lamps are positioned with the longitudinal axes thereof substantially parallel to the surface of the printed circuit strip 18 and arranged in a substantially coaxial alignment along a common longitudinal axis CA. Further, as described in copending application Ser. No. 72,526, now U.S. Pat. No. 4,245,279, assigned to the present assignee, the three lamps 11-13 at the top half of the array are inverted with respect to the three lamps 14-16 at the bottom half of the array.

Referring to FIG. 2, the circuit strip 18 has a "printed circuit" thereon for causing sequential flashing of the lamps by applied firing voltage pulses. In this particular embodiment, essentially the entire printed circuit is provided on one surface of the strip 18, namely, the obverse side of the strip over which the flashlamps are positioned. The substrate of strip 18 comprises an insulating material, such as polystyrene, and the pattern of conductor runs may be provided on the surface thereof by means such as silk screening, chemical etching, etc. Each end of the circuit strip 18 functions as a connector tab, denoted as 18a and 18b respectively. The tab 18a is provided with a pair of electrical terminals 20 and 22, and similarly, the tab 18b is provided with a pair of terminals 20' and 22' for contacting terminals of a camera socket for applying firing voltage pulses to the array. As will be described in more detail hereinafter, the terminals 20 and 20' form part of and are connected to a common circuit conductor run 24 which is connected electrically to one lead-in wire of each of the flashlamps. As a result, terminals 20 and 20' function as part of a "ground" circuit and are shown as having an enlarged configuration for reducing the likelihood of lamps being accidentally flashed by electrostatic voltage when the array is handled.

Figure 3:
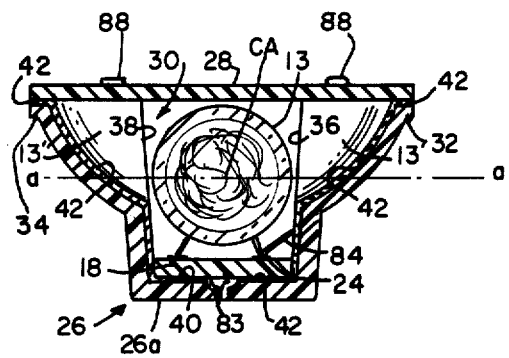
FIG. 3 is an enlarged cross-section view taken along 3—3 of FIG. 1 and showing one of the tapered holes through the rear wall of the housing.

The circuit strip-lamp assembly, which forms the functional core of the unit 10, is enclosed in a comparatively simple and compact housing construction of a cost-efficient and versatile design. More specifically, the unit enclosure comprises just two components, namely, a rear housing member 26 and a light-transmitting cover panel 28. Referring also to FIG. 3, housing member 26 has an elongated configuration and includes a longitudinal channel 30 which has a cross-section which is substantially semi-rectangular. The circuit strip-lamp assembly is located within channel 30, and cover panel 28 is attached to the front of the housing 26 so as to enclose the lamps. As illustrated in FIG. 1, the ends or tabs, 18a and 18b of the circuit strip extend beyond the opposite ends of the elongated cover panel 28 to expose the terminals 20, 22 and 20', 22', thereon for connection to a camera.

The rear housing member 26 further includes outer flanges 32 and 34 which adjoin the opposite sidewalls 36 and 38, respectively, of the semi-rectangular channel. Formed in these outer flanges are a plurality of symmetrical segments of parabolic reflector cavities, with each pair of reflector cavity segments 11', 11", etc., on opposite sides of the channel 30 being associated with a respective one of the flashlamps 11, etc. Housing member 26 is molded of an insulating plastic material, such as polystyrene, but reflective surfaces are provided adjacent to all the flashlamps by covering all of the surfaces of channel 30 (i.e., sidewalls 36 and 38 and rear wall 40) and the surfaces of the outer flanges 32 and 34 which face the cover panel, including the parabolic reflector cavity segments 11', 11", etc., with a continuous coating of conductive reflective material 42. For example, the channel and front surfaces of the flanges may be metalized, such as by an aluminum vacuum deposition process. In this manner, member 26 integrally functions as a compact, cost-efficient, multi-cavity reflector member in addition to functioning as a rear housing enclosure. It will be noted that the lamp-carrying terminal strip is located substantially internal to this reflector member. Further, referring particularly to FIGS. 1 and 3, it will also be noted that the common longitudinal axis CA of the linear array of flashlamps 11, etc., is substantially parallel to the longitudinal axes of printed circuit strip 18 and channel 30 and lies in a plane a—a which symmetrically intersects the parabolic reflector cavity segments 11', 11", etc., on opposite sides of the channel. Hence, portions of the reflector cavities and sidewall reflective surfaces are located behind the longitudinal center line of the lamps so that as each lamp is flashed, light is projected forwardly of the array.

The housing member further includes integral extensions 47 and 47' at the opposite ends thereof which partly surround and protect the extending connector tabs 18a and 18b of the printed circuit strip 18, exposing the terminals thereon, and also function to facilitate mechanical attachment to the camera socket. The printed circuit strip 18 may be secured in channel 30 by means such as providing an interference fit with walls 36 and 38 or by applying a cement between the back of the strip 18 and the rear channel wall 40 (FIG. 3).

The light-transmitting cover panel 28 basically comprises a planar strip of clear plastic material, such as polystyrene, and may be attached to the plastic rear housing member 26 by conventional methods, such as the use of cement or ultrasonic welding about the periphery. Improved structural rigidity and cost-efficiency, however, are provided by a preferred method of attachment described in copending application Ser. No. 72,529, now U.S. Pat. No. 4,245,280, assigned to the present assignee. Referring to FIGS. 1 and 2, the cover panel molding includes four rectangular corner posts 70 which fit into corresponding slots 72 in the housing member flanges and straddle respective ends thereof. These corner posts grip the sides of housing member 26 on the outside and are ultrasonically welded thereto. This secures the ends of the panel and prevents spreading of the respective ends of the housing. Along each side of the midportion of the cover are provided four cylindrical posts 74 (a total of eight) which fit into corresponding holes 76 in the rear housing. Ultrasonically heated and pressure-formed rivet heads (not shown) are formed on the ends of these posts to secure the longitudinal edges of the cover to the housing. Further, cover panel 28 includes a transverse web 78 which projects from the center thereof and fits within slots 80 in the sidewalls 36 and 38 of the housing channel 30. Web 78 thereby bridges the housing channel to provide oppositely directed forces with respect to the four corner posts 70 so as to prevent collapse of the central portion of the cover panel and assure a snug fit. Ultrasonic welding is also employed on each side of the web 78 which engages a slot 80.

As described in copending application Ser. No. 72,534 now U.S. Pat. No. 4,238,814, assigned to the present assignee, the integral transverse web 78 of cover 28 also provides a light-attenuating partition between the tips of lamps 11 and 14 to prevent sympathetic flashing. Additional transverse webs 82 of reduced size are also provided as integral parts of cover 28 to prevent sympathetic flashing between the remainder of the lamps.

When fully assembled, the completed photoflash unit according to the invention is provided with a plug-in connector tab 18a at the lower end thereof which is adapted to fit into a camera or flash adapter. A second plug-in connector tab 18b is provided at the top end of the unit whereby the array is adapted to be attached to the camera socket in either of two orientations, i.e. with either the tab 18a or 18b plugged into the socket. The lamps are arranged in two groups of three disposed on the upper and lower halves, respectively, of the elongated linear array. Upper group 57 comprises lamps 11–13, and lower group 58 includes lamps 14–16; the reflector cavity segments 11′, 11″, etc., along with the reflective channel sidewalls, are associated with the respective lamps so that as each lamp is flashed, light is projected forwardly of the array. The lamps are arranged and connected so that when the array is connected to a camera by the connector tab 18a (such as illustrated in FIG. 1 for the case of camera 60 shown in phantom) only the upper group 57 of the lamps will be flashed, and when the array is turned end for end and connected to the camera by the other connector tab 18b, only the then upper group 58 of lamps will be flashed. By this arrangement, only lamps relatively far from the camera lens axis are flashable, thus reducing the undesirable red-eye effect.

Referring to FIG. 2, the circuit board 18 has a "printed circuit" thereon for causing sequential flashing of the lamps by firing voltage pulses applied to the terminals 20, 22, 20′, 22′. The top and bottom of the printed circuitry preferably are reverse mirror images of each other. The circuit located on the upper half of the circuit strip 18 and activated by the pair of terminals 20 and 22 includes three lamps 11–13 arranged in parallel across the input terminals. The circuit also includes two normally open (N/O) radiant-energy-activated connect switches 61 and 62 for providing sequential flashing of lamps 11–13 in response to firing pulses successively applied to the input terminals 20 and 22. Each N/O connect switch is responsive to the flashing of an associated lamp to form a closed circuit condition. One terminal (lead-in wire) of each of the lamps 11–13 is connected in common by means of an electrical "ground" circuit run 24 to input terminal 20. The "ground" circuit run 24 includes the terminals 20 and 20′ and makes contact with one of the lead-in wires for each of the lamps 11–16. This "ground" circuit crossover is accomplished at the midportion of the circuit strip, without interferring with the "hot", or signal, conductor runs by terminating the common conductor runs 24 on each half of the strip at through-connection points 63 and 64, such as eyelets passing through the strip 18, and interconnecting these points on the reverse side of the strip by a common conductor segment, indicated as 24′.

The first lamp to be fired, namely, lamp 11, is connected directly across the input terminals 20 and 22. The N/O connect switches 61 and 62 are series connected in that order with lamp 13, which is the third and last lamp to be fired, across the input terminals 20 and 22. The second lamp to be fired (lamp 12) is series connected with the N/O switch 61.

Terminal 22 is part of a "hot" or signal circuit conductor run 65 that terminates at a lead-in wire of lamp 11 and one terminal of the N/O switch 61. The other side of switch 61 is connected to a lead-in wire of lamp 12 and to one terminal of N/O switch 62 via circuit run 66. Circuit run 67 then connects the other terminal or switch 62 to a lead-in wire of lamp 13.

The radiant-energy-activated N/O connect switches 61 and 62 are in contact with and bridge across the circuit runs that are connected to them. The material for the connect switch is selected to be of the type initially having an open circuit or high resistance, the resistance thereof becoming literally zero or a lower value when the material receives radiation in the form of heat and/or light from a respective adjacent lamp, upon the lamp being flashed. For this purpose, each of the connect switches is respectively positioned behind and near to an associated flashlamp. More specifically, switch 61 is positioned behind lamp 11, and switch 62 is positioned behind lamp 12.

The high resistance paste used to make switches 61 and 62 may comprise a known mixture of silver compound and a binder. According to a preferred embodiment, however, the material comprises a silver compound such as silver carbonate, a binder such as polystyrene resin, a large proportion of electrically non-conductive inert particulate solids, such as titanium dioxide, and a protective oxidizing agent such as barium chromate. For example, as described in a copending application Ser. No. 21,398, filed Mar. 19, 1979, and assigned to the present assignee, the dried composition of a specific silk screenable high resistance material comprises 67.43% silver carbonate, 22.48% titanium dioxide, 8.99% glass beads, 0.11% barium chromate, 0.07% lecithin as a wetting agent, and 0.91% polystyrene resin as a binder. The barium chromate was included to enhance environmental stability, as described in U.S. Pat. No. 4,087,233. This mixture is made into a paste by ball milling in a suitable solvent such as butyl cellosolve acetate. The solids content may be adjusted to suit the method of switch application. For silk screening over a circuit strip, it is preferred to adjust the solids content to about 74%.

The circuit on the circuit strip 18 functions as follows. Assuming that none of the three lamps on the upper half of the unit have been flashed, upon occurrence of the first firing pulse applied across the terminals 20 and 22, this pulse will be directly applied to the lead-in wires of the first-connected flashlamp 11, whereupon lamp 11 flashes and becomes an open circuit between its lead-in wires. Heat and/or light radiation from the flashing first lamp 11 is operative to activate the N/O connect switch 61. As a result, the radiation causes the normally open connect switch 61 to become a closed circuit (or a low value of resistance), thereby connecting the circuit strip terminal 22 electrically to the second lamp 12 via circuit run 66. By the time this occurs, the firing pulse has diminished to a value insufficient to cause the second lamp 12 to flash. When the next firing pulse occurs, it is applied to the lead-in wires of the second lamp 12 via the now closed connect switch 61, whereupon the second lamp 12 flashes and becomes an open circuit between its lead-in wires, with the lamp radiation causing the connect switch 62 to assume a near zero or low resistance. When the next firing pulse occurs, it is applied via the now closed connect switches 61 and 62 to the lead-in wires of the third flashlamp 13, thereupon causing the lamp to flash. Since this lamp is the last lamp in the active circuit, it does not matter whether its lead-in wires are an open or closed circuit after flashing. When the flash unit is turned around and the other connector tab 18b attached to the camera socket, the group 58 of the lamps that then becomes upper most and farthest away from the camera lens will be in the active circuit and will be flashed in the same manner as has been described. In a preferred embodiment, the lamps 11, etc., are high voltage types requiring about 2,000 volts, for example, at low current for flashing, and they can be fired by impacting or stressing a piezoelectric element in the camera.

The high degree of electrical sensitivity needed in high-voltage flashlamps gives rise to distinct problems of inadvertent flashing during handling of the array package. Any static charges on equipment and personnel can cause the lamp to flash. Accordingly, as described in the aforementioned copending application Ser. No. 72,251, electrostatic protection is provided by the rear housing member 26 in a cost-efficient manner by electrically connecting the conductive coating 42 to the common circuit conductor 24 by means such as a wire 84 soldered therebetween (FIGS. 2 and 3). In this manner, continuous conductive surfaces on rear wall 40 and sidewalls 36 and 38 of channel 30, and on the reflector cavities and front faces of outer flanges 32 and 34, provide a protective electrostatic shield about three sides of the sensitive circuit strip 18 and the lamps 11–16 mounted thereon.

Protection against electrostatic charges about the front face of the unit is provided in a manner following the teaching of U.S. Pat. No. 4,113,424. Cover panel 28 is provided with eight openings 86 distributed throughout the length thereof, as illustrated, and housing member 26 further includes eight metal-coated posts, or projections, 88 which respectively fit into the front face openings 86. Preferably, the conductive reflector projections protrude through the openings 86 in the cover panel beyond the exterior surface thereof, as shown in FIG. 3, so as to assure electrical contact with any charged object such as a user's hand, which may touch the array housing.

As illustrated in FIGS. 1 and 2, projections 88 are symmetrically disposed on the front face of the housing flanges 32 and 34 between reflector cavity segments 11', 11" and 12', 12"; 12', 12" and 13', 13"; 14', 14" and 15', 15"; and 15', 15" and 16', 16". These projections 88 are integral molded portions of the insulating plastic material of housing 26 which are covered with the continuous conductive reflective coating 42. Accordingly, the conductive projection 88 are connected to the common circuit conductor 24 via the surface coating 42 and wire 84.

Figure 4:
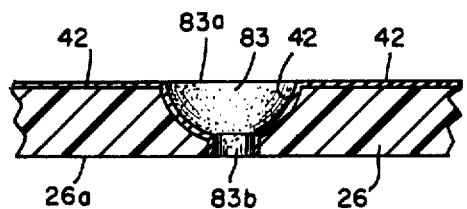
FIG. 4 is an enlarged fragmentary detail cross-section showing the tapered hole through the rear wall of the housing.
Figure 5:
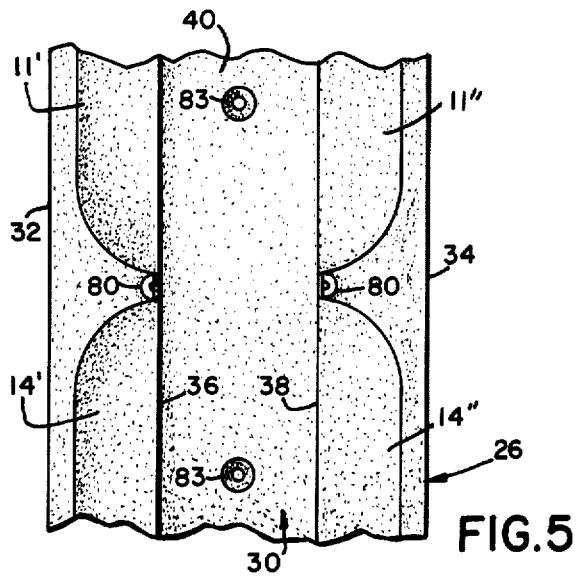
FIG. 5 is a front fragmentary view of the midportion of the rear housing member showing two of the tapered holes therethrough.

In accordance with the present invention, referring to FIGS. 3–5, the electrostatic protection provided by the front face projections 88 is complemented by providing a plurality of openings 83 through the rear wall 40 of the housing channel and by extending the continuous conductive coating 42 through each of these openings to the exterior surface 26a at the rear of the housing member. In one specific embodiment of the invention, four of these openings 83 are distributed linearly along the length of the rear wall of the housing channel, two of the openings being illustrated in FIG. 5. Preferably, the openings 83 each comprise a substantially circular hole which is tapered from a larger diameter 83a on the interior side of the wall to a smaller diameter opening 83b on the exterior side of the wall (FIG. 4). As the housing member 26 is typically a molded plastic piece, the tapered holes 83 would actually take the shape of a cup-shaped concavity for each of molding. The taper particularly facilitates deposition of the aluminization, or other conductive coating, through the hole 83 to the outer surface of the array. In this manner, a potential gradient neutralizing current flow can occur from an external charged object to the common-connected array components via the extended continuous conductive coating 42. The protection thereby provided is essentially absolute with regard to rear face electrostatic flashing. Further, this protection is realized with no cost for additional components or manufacturing operations. That is, the openings, or holes 83, are incorporated merely by a change in the mold design. Thereafter, the same metalizing process can be employed to coat all the internal surfaces (namely, rear wall 40, sidewalls 36 and 38, the reflector cavity segments 11' and 11", etc., and the front faces of outer flanges 32 and 34) of the housing 26 including extension of the coating through each of the tapered openings 83 from the inner diameter portion 83a through to the outer surface 26a of the housing at the smaller diameter portion 83b.

Although the invention has been described with respect to specific embodiments, it will be appreciated that modifications and changes may be made by those skilled in the art without departing from the true spirit and scope of the invention. For example, the conductive coating 42 through the holes 83 can be extended to coat the back surface 26a of the array to form a large area terminal for dissipation of potential electrostatic charges. The construction is not limited to linear high voltage arrays. The array may be single ended, with a connector at only one end; the lamps may all be oriented in one direction; and the number of lamps may vary. For example, a higher output lamp array of the double ended type may comprise two lamps of much larger volume positioned in each of the upper and lower groups housed in a pacakge of slightly larger dimensions.

We claim:

1. A multilamp photoflash unit comprising, in combination, a circuit board having lamp firing circuitry on a surface thereof, an array of electrically ignitable flashlamps disposed on said circuit board, each of said flashlamps having a pair of lead-in wires connected to said circuitry, said circuitry including a common circuit conductor run connected electrically to one lead-in wire of said lamps, a housing member having a channel within which said circuit board is located and having reflective surfaces adjacent to said flashlamps, a continuous coating of electrically conductive reflective material covering the interior walls of said channel for providing said reflective surfaces, means electrically connecting said reflective surfaces to said common circuit conductor run, and one or more openings through the wall of said housing channel, said continuous conductive coating extending through each of said openings to the exterior surface of said housing member, whereby electrostatic protection is provided by extending electrical ground to the exterior of the unit.

2. The photoflash unit of claim 1 wherein each of said openings is tapered through the channel wall from larger at the interior side of the wall to smaller at the exterior side of the wall.

3. The photoflash unit of claim 2 wherein each of said openings is a substantially circular hole tapered from a larger diameter on the interior side of said wall to a smaller diameter on the exterior side of the wall.

4. The photoflash unit of claim 1 wherein said circuit board is in the form of an elongated strip, said flashlamps are disposed in a linear array over said surface, said housing member has an elongated configuration with said channel longitudinally disposed therein, said channel has a cross-section which is substantially rectangular, said continuous coating of conductive reflective material covers the rear wall and opposite sidewalls of said channel, said circuit board is parallel to the rear wall of said channel, and said openings extend through the rear wall of said channel.

5. The photoflash unit of claim 4 wherein said openings are distributed linearly along the length of said rear wall of the housing channel.

6. The photoflash unit of claim 5 wherein each of said openings is a substantially circular hole tapered from a larger diameter on the interior side of said rear wall to a smaller diameter on the exterior side of said rear wall.

7. The photoflash unit of claim 6 wherein said housing member is formed of an insulating material and further includes a plurality of segments of reflector cavities formed on opposite sides of said channel, and the surfaces of said channel, said reflector cavities and said tapered openings in the rear wall of said channel are covered with said continuous coating of conductive reflective material, said housing member thereby functioning as a multicavity reflector member and a shield and discharge means for providing electrostatic protection.

8. The photoflash unit of claim 7 further including a light-transmitting cover panel attached to said housing member and enclosing said flashlamps therein, said cover panel having a plurality of openings therein, and wherein said housing member further includes a plurality of projections covered with said continuous coating of conductive reflective material, said coated projections respectively fitting into the openings of said cover panel and protruding therethrough beyond the exterior surface of said panel.

* * * * *